(12) United States Patent
Rosenstein et al.

(10) Patent No.: US 12,217,215 B1
(45) Date of Patent: Feb. 4, 2025

(54) SYSTEMS AND METHODS TO SELECTIVELY CONFIGURE FEATURES OF A USER INTERFACE OF A COLLABORATION ENVIRONMENT TO LIMIT DISTRACTIONS

(71) Applicant: ASANA, INC., San Francisco, CA (US)

(72) Inventors: Justin Rosenstein, San Francisco, CA (US); Alexander Hood, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 88 days.

(21) Appl. No.: 17/545,808

(22) Filed: Dec. 8, 2021

Related U.S. Application Data

(60) Provisional application No. 63/140,170, filed on Jan. 21, 2021.

(51) Int. Cl.
*G06F 3/048* (2013.01)
*G06F 3/04842* (2022.01)
*G06F 3/04845* (2022.01)
*G06Q 10/0631* (2023.01)
*G06Q 10/10* (2023.01)

(52) U.S. Cl.
CPC ....... *G06Q 10/103* (2013.01); *G06F 3/04842* (2013.01); *G06F 3/04845* (2013.01); *G06Q 10/063118* (2013.01)

(58) Field of Classification Search
CPC .......... G06Q 10/103; G06Q 10/063118; G06F 3/04842; G06F 3/04845
See application file for complete search history.

(56) References Cited

U.S. PATENT DOCUMENTS

| | | | |
|---|---|---|---|
| 7,523,397 B2 * | 4/2009 | Cheung | G06F 9/542 715/710 |
| 8,214,747 B1 * | 7/2012 | Yankovich | G06F 9/4451 715/810 |
| 9,268,875 B2 | 2/2016 | Campbell | |

(Continued)

OTHER PUBLICATIONS

Justin Rosenstein, Focus Mode is a new feature that could raise your IQ, Asana Blog; published Apr. 19, 2013; [retrieved from the internet on Jan. 22, 2021] https://blog.asana.com/2013/04/focus-mode-is-a-new-feature-that-could-raise-your-iq/ (13 pages).

(Continued)

*Primary Examiner* — Mahelet Shiberou
(74) *Attorney, Agent, or Firm* — Esplin & Associates, PC

(57) ABSTRACT

Systems and methods to selectively improve a user interface of a collaboration environment by configuring features of the user interface to limit distractions are disclosed. Exemplary implementations may: manage environment state information maintaining a collaboration environment; manage information defining individual work unit pages for individual units of work; obtain input information conveying user input including user-initiated requests to tailor values of display parameters of the units of work; in response to the user input, generate tailored values of the display parameters of the individual units of work; effectuate presentation of the individual work unit pages in the instances of the user interface in accordance with the tailored values; and/or perform other operations.

20 Claims, 4 Drawing Sheets

(56) References Cited

U.S. PATENT DOCUMENTS

| | | | |
|---|---|---|---|
| 9,367,117 B2 | 6/2016 | Timm | |
| 9,935,934 B1 | 4/2018 | Orozco | |
| 9,978,040 B2* | 5/2018 | Lee | G06Q 10/101 |
| 10,007,406 B1 | 6/2018 | Libin | |
| 11,449,836 B1 | 9/2022 | Clifton | |
| 2005/0164688 A1 | 7/2005 | Satake | |
| 2008/0205616 A1* | 8/2008 | Teng | H04L 65/403 |
| | | | 379/202.01 |
| 2008/0209417 A1* | 8/2008 | Jakobson | G06F 9/4856 |
| | | | 718/100 |
| 2009/0260010 A1* | 10/2009 | Burkhart | G06F 9/451 |
| | | | 718/100 |
| 2014/0068746 A1 | 3/2014 | Diego | |
| 2015/0178666 A1 | 6/2015 | Green | |
| 2016/0285838 A1 | 9/2016 | Ford | |
| 2016/0366569 A1* | 12/2016 | Wu | H04M 1/72436 |
| 2017/0046807 A1 | 2/2017 | Ford | |
| 2017/0068403 A1 | 3/2017 | Ohsumi | |
| 2017/0099148 A1 | 4/2017 | Ochmanski | |
| 2017/0255455 A1* | 9/2017 | Collier | G06F 11/3438 |
| 2018/0152407 A1* | 5/2018 | Soni | H04L 51/18 |
| 2018/0189706 A1* | 7/2018 | Newhouse | G06Q 10/06316 |
| 2018/0367506 A1 | 12/2018 | Ford | |
| 2019/0057356 A1 | 2/2019 | Larsen | |
| 2019/0121863 A1 | 4/2019 | Embiricos | |
| 2019/0121994 A1 | 4/2019 | Embiricos | |
| 2019/0123924 A1 | 4/2019 | Embiricos | |
| 2020/0293975 A1 | 9/2020 | Faulkner | |
| 2021/0014214 A1 | 1/2021 | Ford | |
| 2021/0105280 A1 | 4/2021 | Lansing | |
| 2021/0225321 A1 | 7/2021 | Kogan | |
| 2021/0248161 A1 | 8/2021 | Leston | |
| 2023/0251880 A1 | 8/2023 | Justin | |
| 2024/0086045 A1* | 3/2024 | Lin | G06F 3/0481 |

OTHER PUBLICATIONS

Fang Chen, et al. "Project Progress Tracking Template—Using a Repeatable GSS Process to Facilitate Project Process Management," Proceedings of the 39th Annual Hawaii International Conference on System Sciences (HICSS'06), Kauai, HI, 2006, p. 17c-17c, doi: 10.1109/HICSS.2006.399 (Year: 2006).

C. Wang, G. Bo and Y. Zhang, Design and Implementation of Authentication and Authorization Flow in ESCP System, 2013 Fourth International Conference on Emerging Intelligent Data and Web Technologies, Xi'an, China, 2013, pp. 564-568, doi: 10.1109/EIDWT.2013.101. (Year: 2013).

San Murugesan; Irena Bojanova, "OAuth Standard for User Authorization of Cloud Services," in Encyclopedia of Cloud Computing IEEE, 2016, pp. 406-416, doi: 10.1002/9781118821930.ch34. (Year: 2016).

Y. Wu, L. He, Y. Shan, P. Zhang, M. He and Z. Yang, "TrustyShare: A Sharing Scheme using ARM TrustZone," 2020 IEEE 19th International Conference on Trust, Security and Privacy in Computing and Communications (TrustCom), Guangzhou, China, 2020, pp. 1741-1747, doi: 10.1109/TrustCom50675.2020.00239. (Year: 2020).

\* cited by examiner

SYSTEMS AND METHODS TO SELECTIVELY CONFIGURE FEATURES OF A USER INTERFACE OF A COLLABORATION ENVIRONMENT TO LIMIT DISTRACTIONS

FIELD OF THE DISCLOSURE

The present disclosure relates to systems and methods to improve a user interface of a collaboration environment by selectively configuring features of the user interface to limit distractions.

BACKGROUND

Collaboration environments, sometimes referred to as work management platforms, may enable users to assign projects, tasks, or other assignments to assignees (e.g., other users) to complete. A collaboration environment may comprise an environment in which a virtual team of users does its work. A collaboration environment may enable users to work in a more organized and efficient manner. A collaboration environment may integrate features and/or functionality such as web-based conferencing and collaboration, desktop videoconferencing, instant message, and/or other features into a single easy-to-use and intuitive interface.

SUMMARY

One aspect of the present disclosure relates to a system configured to selectively configure features of a user interface of a collaboration environment to limit distractions. Sometimes users need to quickly get into a flow state to efficiently and effectively get work done. However, when it is "crunch time," users may get distracted by the depth of information, notifications, and/or other features a collaboration environment provides, making it difficult to focus on a limited set of work. One or more implementations described herein may provide a way to filter out distractions so a user can focus on one (or more) tasks by improving the way a user interface presents (or limits its presentation of) content. What is automatically filtered out in the user interface, and what is still made available, may be tailored by a given user thereby causing personalized changes to the user interface itself. For example, a user may specifically indicate what features/functionality are not relevant to what they are working on (and therefore filter out/disable as distractions) and what features/functionality are agnostic to distractions (and therefore maintained as available). A user interface of the collaboration environment may include one or more selectable user interface elements, such as a virtual button or menu option, to quickly engage this mode. Pop-ups features may be provided where the user selects what is filtered out and what is still provided. The user selection may include an indication of some level of importance (sliding scale), on/off, a duration associated with the focused mode, and/or other input to indicate whether an item is a distraction or not. Within this focused mode, user interface features (e.g., notifications, pop-ups, banners, chat interfaces, etc.) may be disabled, silenced, and/or otherwise made unavailable if indicated as distraction. A page for a unit of work being focused on may be shown on a single user interface display, with minimal distractions. Further, the functioning of a server hosting the collaboration environment and/or the client computing platforms of the users themselves may be improved by virtue of running in the focused mode. For example, the server may be performing fewer processes (e.g., less processor load) and therefore may run more efficiently due to a reduction of features and/or functionally being served to the client computing platforms.

One or more implementations of a system to selectively configure features of a user interface of a collaboration environment to limit distractions may include one or more hardware processors configured by machine-readable instructions. Executing the machine-readable instructions may cause the one or more hardware processors to facilitate selectively configuring features of a user interface of a collaboration environment to limit distractions. The machine-readable instructions may include one or more computer program components. The one or more computer program components may include one or more of an environment state component, a focus component, a user interface component, and/or other components.

The environment state component may be configured to manage environment state information maintaining a collaboration environment and/or other information. The collaboration environment may be configured to facilitate interaction by users with the collaboration environment. The environment state information may define records. The records may include one or more of user records, work unit records, and/or other records. The work unit records may include values of work unit parameters defining units of work assigned to the users within the collaboration environment. The work unit parameters may include display parameters for individual units of work. The display parameters may characterize features of work unit pages through which the users access the units of work and/or other pages through which users access other work. By way of non-limiting illustration, the work unit records may include a first work unit record for a first unit of work assigned to a first user. The first unit of work may be associated with a first work unit page through which the users access the first unit of work.

The environment state component may be configured to manage information defining the work unit pages for the units of work assigned to individual users. The individual work unit pages may include individual sets of features in accordance with default values of the display parameters for individual units of work. By way of non-limiting illustration, the first work unit page may include a first set of the features in accordance with the default values of the display parameters of the first unit of work.

The user interface component may be configured to obtain input information conveying user input into a user interface of the collaboration environment presenting the work unit pages. The user input may include user-initiated requests to tailor the values of the display parameters differently from the default values. Tailoring the values differently from the default values may include changing the values from the default values to other values. By way of non-limiting illustration, the user input may include a first user-initiated request to tailor the values of the display parameters of the first unit of work.

The focus component may be configured to, in response to the user input, generate tailored values of the display parameters of the individual units of work. The tailored values of the display parameters for the individual units of work may be associated with individual subsets of the features for the individual work unit pages. By way of non-limiting illustration, in response to the first user-initiated request, focus component may be configured to generate a first set of tailored values of the display parameters of the first unit of work. The first set of tailored values may be associated with a first subset of the features in the first work unit page. The first subset of the features may represent features that may be deemed as non-disruptive so that the user can focus on completing work. Accordingly, the features included in the first set of the features but not included in the first subset of the features may include features deemed a distraction.

The user interface component may be configured to effectuate presentation of the individual work unit pages in instances of the user interface in accordance with the tailored values of the display parameters to reflect the individual subsets of the features. By way of non-limiting illustration, the first work unit page may be presented in accordance with the first set of tailored values to reflect the first subset of the features.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
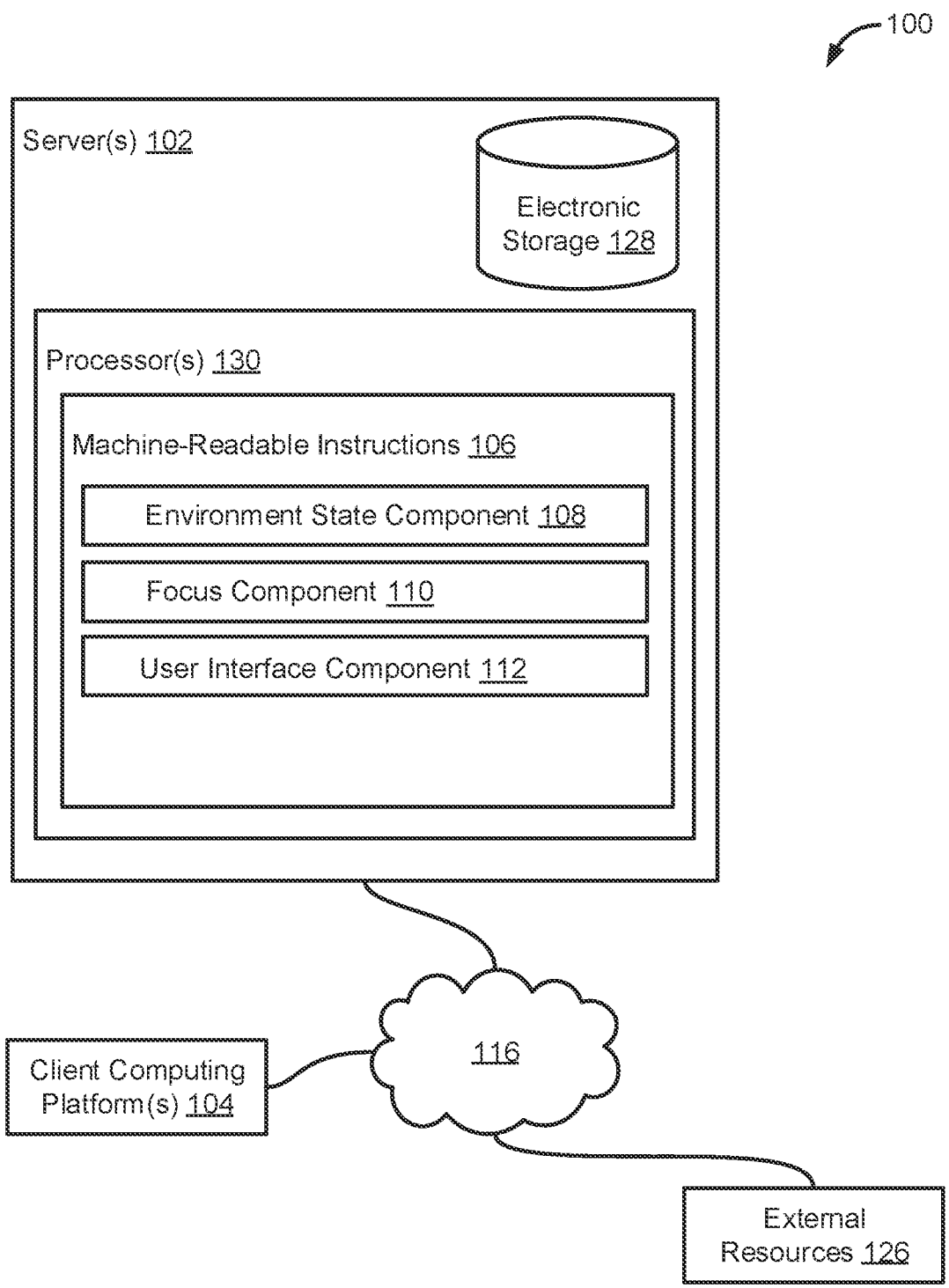
FIG. 1 illustrates a system configured to selectively configure features of a user interface of a collaboration environment to limit distractions, in accordance with one or more implementations.

FIG. 1 illustrates a system 100 configured to selectively configure features of a user interface of a collaboration environment to limit distractions, in accordance with one or more implementations. The system 100 may limit one or more features and/or functionality of a user interface presenting the collaboration environment to help reduce distractions. A user interface of the collaboration environment may include a selectable user interface element such as a virtual button or menu option to quickly engage this mode. Within this focused mode, user interface features may be disabled, silenced, and/or otherwise not made available. Disabling user interface features may reduce the processing requirements at server(s). A page for a unit of work being focused on may be shown on a single user interface display, with minimal distractions.

In some implementations, system 100 may include one or more of one or more servers 102, one or more client computing platforms 104, external resources 126, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may include one or more of non-transitory electronic storage 128, one or more processors 130 configured by machine-readable instructions 106, and/or other components. Machine-readable instructions 106 may include one or more instruction components. The instruction components may include computer program components. Executing the machine-readable instructions 106 may cause server(s) 102 to facilitate selectively configuring features of a user interface of a collaboration environment to limit distractions. The computer program components may include one or more of an environment state component 108, a focus component 110, a user interface component 112, and/or other instruction components.

Environment state component 108 may be configured to manage environment state information and/or other information used in maintaining a collaboration environment. The collaboration environment may be configured to facilitate interaction by users within the collaboration environment. The environment state information may include information defining work that may be managed and/or organized via the collaboration environment. The environment state information may include one or more of user information, objective information, work information, information defining individual user interface pages for work (e.g., task pages for tasks, project pages for projects, etc.), and/or other information used to define, support, and/or otherwise maintain a collaboration environment.

The user information may include values of user parameters. The values of the user parameters may be organized in user records corresponding to users interacting with and/or viewing the collaboration environment. The values of the user parameters may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user.

The values of the user parameters may, by way of non-limiting example, specify one or more of: a user name, a group parameter, a user account, a user role information, a user department, descriptive user content, a to-email, a from-email, a photo, an organization, a workspace, one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), one or more notification settings, one or more progress parameters, status information for one or more work units the user is associated with (units of work assigned to the user, assigned to other users by the user, completed by the user, past-due date, and/or other information), progress information for one or more business objectives the user is associated with (business objectives owned by the user, of which the user is a collaborator, fulfilled by the user, past-due date, and/or other information), one or more performance metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., username/password for one or more third-party applications), one or more favorites and/or priorities, schedule information, and/or other information.

User role information may specify individual roles of the individual users. A role may represent a position of an individual user. The position may be specified based on a description of one or more of a job title, level, stage, and/or other descriptions of position. The role may be specified with respect to a company as a whole, a particular unit of work, and/or other considerations. By way of non-limiting illustration, a role may include one or more of chief executive officer (or other officer), owner, manager, supervisor, accountant, associate, employee, entry level, midlevel, senior, administrator, director, foreman, engineer, product developer, human resource officer, artist, art director, and/or other description.

The work information may include values of one or more work unit parameters. The values of the work unit parameters may be organized in work unit records corresponding to units of work managed, created, and/or assigned within the collaboration environment. A given work unit may have one or more assignees and/or team members working on the given work unit. Work units may include one or more to-do items, action items, objectives, and/or other units of work one or more users should accomplish and/or plan on accomplishing in order to complete the units of work.

Units of work may be created by a given user for the given user and/or created by the given user and assigned to one or more other users. Individual units of work may include one or more of an individual project, an individual task, an individual sub-task, and/or other units of work assigned to and/or associated with one or more users. Individual units of work may include one or more digital content items. An individual unit of work may include an individual digital content item by virtue of the individual digital content item (and/or a copy or instance thereof) being attached and/or appended thereto. A digital content item may include one or more of an image, a video, an audio file, a PDF, a word document, and/or other digital content items. An individual project may include one or more tasks and/or other units of work within a heading of the individual project.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access by one or more users unless and/or until a subordinate work unit record is completed and/or started.

Individual work unit records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

In some implementations, as a consequence of the record hierarchies, the individual units of work described in the individual work unit records that are subordinate to the other individual work unit records may be subordinate to the individual units of work in the other individual work unit records.

In some implementations, the one or more work unit parameters may include one or more of a work assignment parameter, a work management parameter, work creation parameter, work completion parameter, one or more display parameters, and/or other parameters. The values of the work assignment parameter may describe assignment of units of work to the individual users. The values of the work management parameter may describe management by the individual users. The values of the work creation parameter may describe creation of the individual units of work.

The values of the display parameters may characterize features of work unit pages through which the users access the units of work. Access to the units of work may include access to information defined in work unit records of the units of work. Access may include the ability to view, edit, add, delete, and/or otherwise interact with the information defined in the records. A work unit page may comprise a portion of a user interface and/or a user interface dedicated to a unit of work. In some implementations, individual work unit pages may include individual sets of the features in accordance with default values of the display parameters for individual units of work. The features may include one or more of display features, functionality features, and/or other features.

The display features may correspond to visual content displayed on the individual work unit pages. Visual content displayed on the individual work unit pages may refer to content which is presented visually and may or may not facilitate direct user interaction with the content. The display features may include one or more of a notification display feature, an aesthetic display feature, a GUI arrangement feature, and/or other features.

A value of a display parameter characterizing a notification display feature may correspond to visual content conveying notifications and/or alerts. Notifications and/or alerts may include one or more of system notification and/or alerts, notification and/or alerts from other users, notification and/or alerts from external resource(s) 126, and/or other information. The value of the display parameter characterizing the notification display feature may include one or more of an indication of availability, an extent or degree in which the visual content is displayed, and/or other information. An indication of availability may include whether the feature as a whole is enabled (e.g., presented in the user interface) or disabled (e.g., not served to the client computing platforms and/or not presented in the user interface). The extent or degree in which the visual content is displayed may include an indication of types of information that are (and/or are not) included in the visual content. By way of non-limiting illustration, a value of the display parameter characterizing the notification display feature may indicate that system notifications and/or alerts are enabled but notifications and/or alerts from other users are disabled.

A value of a display parameter characterizing an aesthetic display feature may correspond to visual content including aesthetic features. Aesthetic features may refer to features that generally do not provide functional benefit and/or convey usable information to a user, but may be included in a user interface for their pleasing characteristics. By way of non-limiting illustration, aesthetic features may include one or more of color and/or design of backgrounds, color and/or design of individual GUI elements, graphic display banners, and/or other features. The value of the display parameter characterizing the aesthetic display feature may include one or more of an indication of availability, an extent or degree in which the visual content is displayed, and/or other information. An indication of availability may include whether the feature as a whole is enabled (e.g., presented in the user interface) or disabled (e.g., not presented in the user interface and/or not served to client computing platforms from server(s) 102). The extent or degree in which the visual content is displayed may include an indication of types of aesthetic features that are (and/or are not) included in the visual content. By way of non-limiting illustration, a value of the display parameter characterizing the aesthetic display feature may indicate that displaying a color background is enabled but displaying a graphic banner is disabled.

A value of a display parameter characterizing a GUI arrangement feature may correspond to visual content comprising the arrangement of various GUI elements of a user interface. The arrangement of various GUI elements of a user interface may refer to particular GUI elements that are presented and/or how they are presented. By way of non-limiting illustration, individual GUI elements may be used to convey values of one or more work unit parameters describing a unit of work and/or other information to a user. How they are presented may refer to location and/or size of the elements. Location may include centered, at an edge, at a corner, and/or other locations. Size may include larger (than a default size and/or relative to other elements), smaller (than a default size and/or relative to other elements), and/or other considerations. The value of the display parameter characterizing the GUI arrangement feature may include one or more of an indication of availability, an extent or degree in which the visual content is displayed, and/or other information. An indication of availability may include whether the feature as a whole is enabled (e.g., presented in the user interface) or disabled (e.g., not presented in the user interface). The extent or degree in which the visual content is displayed may include an indication of types of elements that are (and/or are not) included in an arrangement and/or how they are presented. By way of non-limiting illustration, a value of the display parameter characterizing the GUI arrangement feature may indicate that GUI elements representing attachments a user is reviewing are displayed larger and centered in a user interface while other GUI elements are removed and/or made relatively smaller in the user interface. By way of non-limiting illustration, a value of the display parameter characterizing the GUI arrangement feature may indicate that GUI elements representing a particular subset of units of work are the only GUI elements displayed in a particular view of a user interface.

The functionality features may correspond to functional content available on the individual work unit pages. Functional content available on the individual work unit pages may refer to one or more of content that may facilitate direct user interaction with the content, content that may return information and/or perform an action in response to the user interaction, and/or other content The functionality features may include one or more of a navigation feature, a communication feature, an external resource access feature, and/or other features.

A value of a display parameter characterizing a navigation feature may correspond to functionality of navigating through content of the collaboration environment. Navigating through content of the collaboration environment may include navigating between pages, windows, and/or other views provided by the collaboration environment. Navigation may be facilitated by scrolling, selecting, and/or other techniques. The value of the display parameter characterizing the navigation feature may include one or more of an indication of availability, an extent or degree in which the functionality associated therewith is enabled (or disabled), and/or other information. An indication of availability may include whether the functionality as a whole is enabled (e.g., navigation is available) or disabled (e.g., navigation is not available). The extent or degree in which the functionality is enabled may include an indication of limits and/or constraints on the functionality. By way of non-limiting illustration, a value of the display parameter characterizing the navigation feature may indicate that navigation as whole is disabled. By way of non-limiting illustration, a value of the display parameter characterizing the navigation feature may indicate that navigation to one or more pages of the collaboration environment are enabled but navigation to other pages is disabled.

A value of a display parameter characterizing a communication feature may correspond to the functionality of communicating within the collaboration environment. Communicating within the collaboration environment may be facilitated by one or more of synchronous communication, asynchronous communication, semi-synchronous communication, and/or other techniques. Communicating within the collaboration environment may include one or more of instant messaging, posting of comments, posting on a message thread and/or board, and/or other communication techniques. The value of the display parameter characterizing the communication feature may include one or more of an indication of availability, an extent or degree in which the functionality associated therewith is enabled (or disabled), and/or other information. An indication of availability may include whether the functionality as a whole is enabled (e.g., communication is available) or disabled (e.g., communication is not available). The extent or degree in which the functionality is enabled may include an indication of limits and/or constraints on the functionality. By way of non-limiting illustration, a value of the display parameter characterizing the communication feature may indicate that communication as whole is disabled. By way of non-limiting illustration, a value of the display parameter characterizing the communication feature may indicate that communication with a limited set of one or more users of the collaboration environment is enabled. By way of non-limiting illustration, a value of the display parameter characterizing the communication feature may indicate that communication within a comments section is enabled but communication within an instant messaging feed is disabled.

A value of a display parameter characterizing an external resource access feature may correspond to the functionality of accessing resources outside of the collaboration environment (e.g., external resource(s) 126). Accessing resources outside of the collaboration environment may be facilitated by one or more of third-party applications existing outside of the collaboration environment, third-party applications existing outside of the collaboration environment but accessible through the collaboration environment without leaving the collaboration environment, and/or other techniques. The value of the display parameter characterizing the external resource access feature may include one or more of an indication of availability, an extent or degree in which the functionality associated therewith is enabled (or disabled), and/or other information. An indication of availability may include whether the functionality as a whole is enabled (e.g., access to external resources is available) or disabled (e.g., access to external resources is not available). The extent or degree in which the functionality is enabled may include an indication of limits and/or constraints on the functionality. By way of non-limiting illustration, a value of the display parameter characterizing the external resource access feature may indicate that access to external resources as a whole is disabled. By way of non-limiting illustration, a value of the display parameter characterizing the external resource access feature may indicate that access to a given third-party application is enabled while access to one or more other third-party applications is disabled.

In some implementations, values of work unit parameters may include one or more of a unit of work name, a unit of work description, one or more unit of work dates (e.g., a start date, a due date or end date, a completion date, and/or dates), one or more members associated with a unit of work (e.g., an owner, one or more other project/task members, member access information, and/or other unit of work members and/or member information), a status parameter (e.g., an update, a hardcoded status update, a completed/incomplete/mark complete, a measured status, a progress indicator, quantity of sub-work units remaining for a given unit of work, completed work units in a given project, and/or other status parameter), one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given work unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, subtasks within a task, etc.), state of a workspace for a given unit of work (e.g., application state parameters, application status, application interactions, user information, and/or other parameters related to the state of the workspace for a unit of work), hierarchical information, one or more custom fields (e.g., priority, cost, stage, and/or other custom fields), and/or other information.

The values of the work assignment parameter describing assignment may be determined based on one or more interactions by one or more users with a collaboration environment. In some implementations, one or more users may create and/or assign one or more units of work to themselves and/or another user. In some implementations, a user may be assigned a unit of work and the user may effectuate a reassignment of the unit of work from the user or one or more other users.

In some implementations, values of the work completion parameter may indicate that a status of a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date).

In some implementations, managing by the environment state component 108 the environment state information may include maintaining queues of the units of work assigned to the users. The queues may be presented to the users in a user interface of the collaboration environment to facilitate access to the units of work via work unit pages. Individual queues may represent the units of work assigned to individual users organized in an order based on the individual end dates and/or other dates (e.g., start dates) and/or other ordering. Individual queues may be presented in a user interface based on one or more of a list view, a calendar view, and/or other views. The calendar view may be a calendar view by week, by more than one week (e.g., $1^{st}$ through $15^{th}$), by month, by more than one month (e.g., May through July), and/or other calendar views. Units of work may be representing in a calendar view by user interface elements (e.g., icons, calendar entries, etc.). By way of non-limiting illustration, the units of work may include a first set of units of work assigned to a first user. The first set of units of work may be represented in a first temporal queue. The first set of units of work may be organized in chronological order based on the individual end dates.

The objective information may include values of one or more objective parameters. The values of the objective parameters may be organized in objective records corresponding to business objectives managed, created, and/or owned within the collaboration environment. A given business objective may have one or more collaborators, and/or team members working on the given business objective. Business objectives may include one or more associated units of work one or more users should accomplish and/or plan on accomplishing. Business objectives may be created by a given user for the given user and/or created by the given user and assigned to be owned to one or more other users. Individual business objectives may include one or more of an individual goal, an individual sub-goal, and/or other business objectives assigned to be owned by a user and/or associated with one or more users.

Individual objective records may describe individual business objectives and identify sets of individual ones of the work unit records that specify the units of work associated with the individual business objectives. By way of non-limiting illustration, a first objective record may describe a first business objective and identify a set of work unit records that specifies a set of units of work associated with the first business objective.

Individual sets of objective records may be defined by an objective record hierarchy. An objective record hierarchy may convey individual positions of objective records (and their corresponding business objectives) in the objective record hierarchy. By way of non-limiting illustration, a position may specify one or more of an objective record being superior to one or more other objective records, an objective record being subordinate to one or more other objective records, and/or other information. As a result, individual objective records may be subordinate and/or superior to other individual objective records. For example, the objective records may further include a second objective record. The first objective record and the second objective record may be organized by a first objective record hierarchy specifying that the second objective record is subordinate to the first objective record.

An objective record may define a business objective comprising a progress towards fulfillment, and a subordinate objective record may define a business objective comprising a subordinate progress towards fulfillment to the subordinate business objective. An objective record hierarchy may define a relationship between objective records. The business objectives may be associated with a set of units of work that may indirectly facilitate progress toward fulfillment of the business objectives. The set of units of work may not directly contribute to the progress. By way of non-limiting illustration, a connection between the set of units of work and a corresponding business objective may be indirect in that completion of at least one of the units of work may have no direct impact on progress toward fulfillment of the business objective. The concept of "no direct impact" may mean that completion of the at least one unit of work may not cause progress toward fulfillment of the business objective without independent action outside of the at least one unit of work. Instead, the fulfillment of the at least one business objective may make such independent action more likely (e.g., through coercion, assistance, education, incentivization, reminder, etc.). However, in some implementations, business objectives may be associated with a set of units of work that may directly facilitate progress toward fulfillment of the business objectives. Accordingly, completion of the set of units of work may directly contribute to the progress toward fulfillment. Business objectives may be associated with an objectives and key result (OKR) goal-setting framework. Business objectives may be specified on one or more of a team basis, organization basis, and/or other specifications. In some implementations, business objectives may be characterized as user objectives. The user objectives may be associated with a set of units of work that may indirectly (and/or directly) facilitate progress toward fulfillment of the user objectives. User objectives may be specified on an individual user basis.

Individual objective records may include hierarchical information defining an objective record hierarchy of the individual objective records. The hierarchical information of an objective record may include one or more of information identifying other objective records associated in an objective record hierarchy the objective record belongs to, a specification of the position of the objective record in the hierarchy, other relationships placed on the objective record by virtue of its position, and/or other information.

In some implementations, as a consequence of the objective record hierarchies, the individual business objectives described in the individual objective records that are subordinate to the other individual objective records may be subordinate to the individual business objectives in the other individual objective records.

In some implementations, the one or more objective parameters may include one or more of an objective definition parameter, an objective owner parameter, an objective management parameter, an objective creation parameter, an objective progress parameter, and/or other parameters. The value of the objective definition parameter may describe the particular business objective. The values of the objective owner parameter may describe business objectives assigned to be owned by an individual user. The values of the objective management parameter may describe business objectives managed as collaborators by the individual users. The values of the objective creation parameter may describe business objectives created by the individual users.

In some implementations, the business objectives may be described based on one or more of a business objective name, a business objective description, one or more business objective dates (e.g., a start date, a due date, and/or dates), one or more members associated with a business objective (e.g., an owner, one or more other project/task members, member access information, and/or other business objective members and/or member information), progress information (e.g., an update, a hardcoded status update, a measured status, a progress indicator, quantity value remaining for a given business objective, completed work units in a given project, and/or other progress information), one or more interaction parameters, notification settings, privacy, an associated URL, one or more custom fields (e.g., priority, cost, stage, and/or other custom fields), and/or other information.

The values of the objective owner parameter describing ownership may be determined based on one or more interactions by one or more users with a collaboration environment. In some implementations, one or more users may create and/or assign ownership of one or more business objectives to themselves and/or another user. In some implementations, a user may be assigned to own a business objective and the user may effectuate a reassignment of ownership of the business objective from the user or one or more other users.

Environment state component 108 may be configured to manage information defining individual work unit pages. Managing information defining individual work unit pages may include determining, obtaining from records, and/or modifying values of display parameters of the individual units of work. Managing information defining individual work unit pages may include providing values of display parameters and/or other information to the user interface component 112 to effectuate presentation of the work unit pages. By way of non-limiting illustration, the work unit records may include a first work unit record for a first unit of work assigned to a first user. The first unit of work may be associated with a first work unit page through which the users access the first unit of work. Environment state component 108 may be configured to manage information defining the first work unit page based on determining, obtaining, and/or modifying values of display parameters of the first unit of work. In some implementations, the first work unit page may include and/or facilitate a first set of the features in accordance with default values of the display parameters of the first unit of work.

The user interface component 112 may be configured to effectuate presentation of individual user interfaces on individual client computing platforms of one or more client computing platforms 104. The user interface component 112 may be configured to effectuate presentation of a user interface of the collaboration environment based on environment state information and/or other information. The user interface may display one or more of the units of work in work unit pages, business objectives in objective pages, queues of units of work, and/or other information.

In some implementations, the user interface may display queues of units of work. In some implementations, queues may include icons, graphics, text, and/or other elements. Selection of a unit of work from the queues may facilitate generating views of work unit pages displaying the unit of work.

In some implementations, environment state information may be updated as users continue to interact with the collaboration environment via the user interfaces over time. The environment state component 108 may store and/or archive the environment state information periodically and/or based on user request to archive. In some implementations, the environment state component 108 may store historical environment state information specifying historical user information, historical work information, historical objective information, user interaction history, and/or other information.

In some implementations, user interface component 112 may be configured to obtain input information and/or other information. The input information may convey user input into the user interface presented on the client computing platform(s) 104. A set of user interface elements may be provided on the user interface to facilitate the user input and/or other user interaction with the user interface. The user interface elements may include one or more of text input fields, drop-down menus, check boxes, display windows, virtual buttons, and/or other elements configured to facilitate user interaction.

The input information may convey user input into a user interface of the collaboration environment presenting the work unit pages. The user input may include one or more of user-initiated requests to tailor the values of the display parameters differently from the default values, duration over which tailored values of the display parameters of the individual units of work are implemented, context information, and/or other information. By way of non-limiting illustration, the user input may include a first user-initiated request to tailor the values of the display parameters of the first unit of work.

In some implementations, tailoring the values of the display parameters differently from the default values may cause the set of features available in a given work unit page to be reduced and/or modified to reflect a subset of the features. Accordingly, tailoring the values of the display parameters may reflect the individual subsets of the features by disabling and/or modifying one or more of the features not included in the individual subsets of the features. In some implementations, tailoring the values of the display parameters may be achieved by limiting the information being served to the client computing platform(s) 104 from resource(s) within and/or external to the system 100. In some implementations, the user input may include specific indication of one or more of the display features and/or one or more of the functionality features to enable and/or disable.

In some implementations, the user input may include duration over which tailored values of the display parameters of the individual units of work are implemented. Upon reaching the duration, the values of the display parameters may be set back to the default values.

In some implementations, the user input may include input defining context information for a given unit of work. The context information may describe relationships between a unit of work and the features available in a work unit page. In some implementations, a relationship between a given unit of work and a given feature of a work unit page may be defined by a relevancy measure and/or other information. In some implementations, the relevancy measure between a given feature and a given unit of work may convey one or more of an indication of whether the given feature assists in a completion of (or distracts from the completion of) the given unit of work, an extent or degree in which the given feature assists in a completion of (or distracts from the completion of) the given unit of work, and/or other information. An indication of whether the given feature assists in a completion of (or distracts from the completion of) the given unit of work may be binary, meaning the relevancy measure may convey the given feature either "assists" or "detracts" and the feature is either "enabled" or "disabled". "Assists" may mean that the feature is relevant; "detracts" may mean that the feature is a distraction. The extent or degree in which the given feature assists in a completion of (or distracts from the completion of) the given unit of work may comprise a sliding scale of values. For example, extent or degree in which the given feature assists in a completion of (or distracts from the completion of) the given unit of work may comprise one or more of greatly assists, assists, moderately assists, neutral, moderately detracts, detracts, greatly detracts, and/or other information.

In some implementations, user interface component 112 may be configured to effectuate presentation of a user interface and/or a user interface portion configured to receive user input conveying context information. The user interface and/or user interface portion may include one or more of a menu, drop-down menu, check boxes, and/or other features. By way of non-limiting illustration, a pop up menu may be displayed within a work unit page for a unit of work. The pop up menu may display a set of features available for work unit pages. For individual features, the user may provide input of a relevancy measure as it relates to a given unit of work. In some implementations, a menu may be provided where a user provides input of a relevancy measure for individual features as it applies to more than one unit of work. By way of non-limiting illustration, relevancy measures may be provided for individual features as it relates to units of work under a given project, units of work under a given business objective, and/or other specified sets of units of work.

The focus component 110 may be configured to generate tailored values of the display parameters of the individual units of work in response to the user input obtained by user interface component 112. The tailored values of the display parameters for the individual units of work may be associated with individual subsets of the features for the individual work unit pages. By way of non-limiting illustration, in response to the first user-initiated request, focus component 110 may be configured to generate a first set of tailored values of the display parameters of the first unit of work. The first set of tailored values may be associated with a first subset of the features in the first work unit page.

In some implementations, generating the tailored values of the display parameters of the individual units of work may be based on the context information and/or other information. In some implementations, the features associated with a relevancy measure conveying that a given feature assists in the completion of the given unit of work may be features included in the individual subsets of features. In some implementations, the features associated with a relevancy measure meeting and/or exceeding a threshold on the sliding scale may be features included in the individual subsets of features. By way of non-limiting illustration, the tailored values of the display parameters for the given unit of work may be generated based on the context information for the given unit of work so that a given subset of the features for a given work unit page for the given unit of work reflects the relevancy between the given unit of work and individual features in the given subsets of the features.

The user interface component 112 may be configured to effectuate presentation of the individual work unit pages in the user interface in accordance with the tailored values of the display parameters to reflect the individual subsets of the features. By way of non-limiting illustration, the first work unit page may be presented in accordance with the first set of tailored values to reflect the first subset of the features.

In some implementations, effectuating presentation of the individual work unit pages in the user interface in accordance with the tailored values of the display parameters to reflect the individual subsets of the features may include disabling and/or modifying one or more of the features not included in the individual subsets of the features. The features not included in the individual subsets of the features may be features which may be deemed as being distracting and/or not pertinent to the work at hand.

In some implementations, the features in a work unit page may include one or more agnostic features that are agnostic to the user-initiated requests to limit distractions. Accordingly, the one or more agnostic features may be made available on the individual work unit pages when either the default values or the tailored values are set for the display parameters. By way of non-limiting illustration, the one or more agnostic features may be present in the first set of features and the first subset of the features as it relates to the first work unit page.

Figure 3:
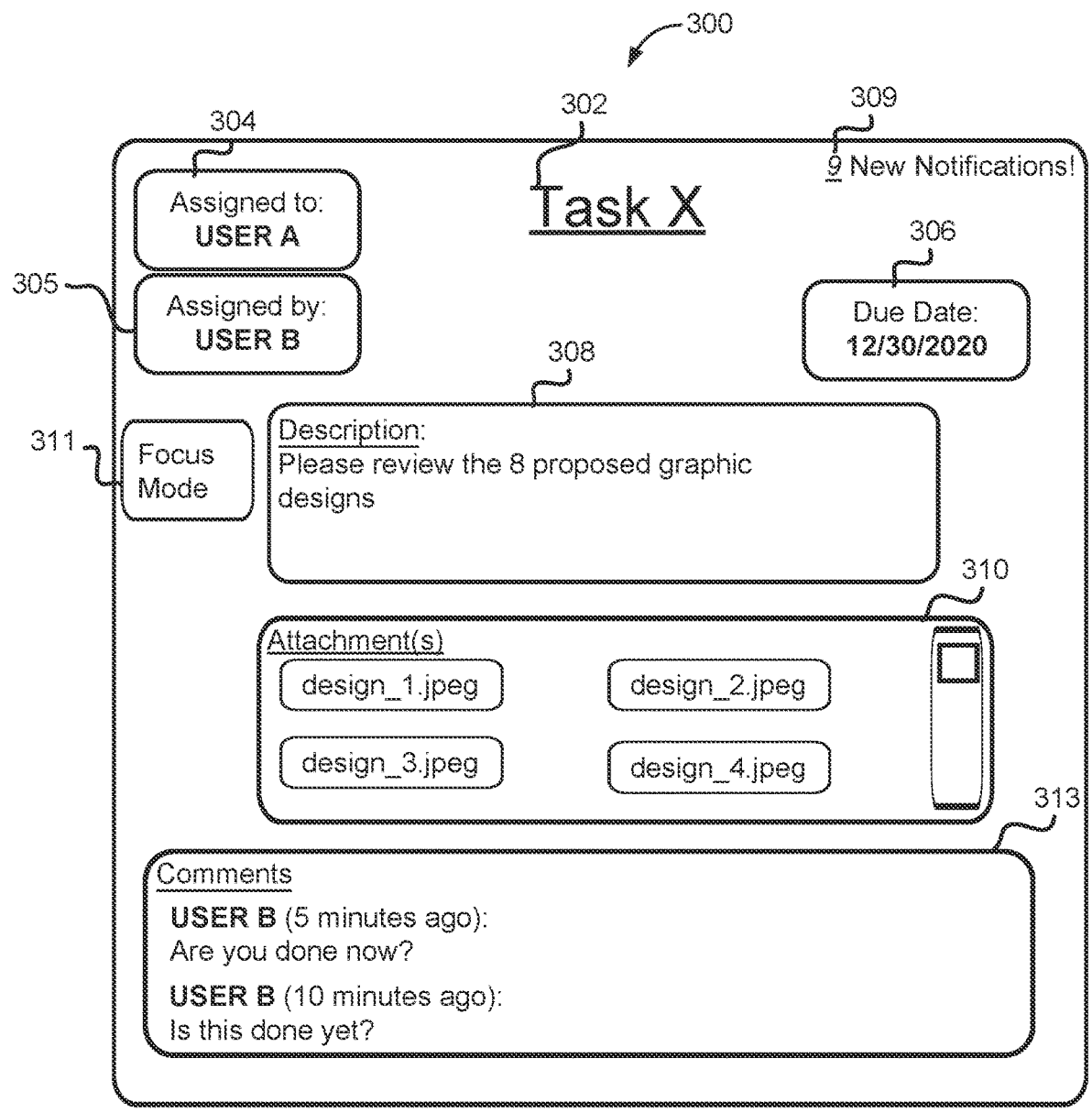
FIG. 3 illustrates a user interface, in accordance with one or more implementations.

FIG. 3 illustrates a user interface 300, in accordance with one or more implementations. The user interface 300 may comprise a first work unit page to display a first unit of work. The user interface 300 may display different values of one or more work unit parameters of the first unit of work, and/or other information. The user interface 300 may be configured based on values of the display parameters of the first unit of work. For illustrative purposes, FIG. 3 may represent default values of the display parameters (e.g., prior to filtering out distractions). The various user interface elements may correspond to features available to a user accessing the first unit of work via the first work unit page. By way of non-limiting illustration, a user interface element 302 may display a title of the first unit of work (e.g., Task X). A user interface element 304 may display an assignee of the first unit of work (e.g., User A). A user interface element 305 may display an assignor of the first unit of work (e.g., User B). A user interface element 306 may display a due date of the first unit of work. A user interface element 308 may display a unit of work description for the first unit of work. A user interface element 309 may display notifications and/or alerts and/or provide functionality of accessing the notifications and/or alerts. A user interface element 310 may include digital content items included in the first unit of work. A user interface element 313 may display a comments section and/or may provide functionality of entering comments. A user interface element 311 may provide functionality of tailoring the values of the display parameters different from the default values.

As mentioned, FIG. 3 may represent default values of the display parameters and prior to improvements to the user interface that filter out distractions. As such, the user interface 300 may include an overwhelming amount of information. Given the task at hand, e.g., reviewing 8 attachments of graphics designs, a user may have difficulty staying focused to complete the task efficiently. This difficulty may be compounded by the presence of the comments section (user interface element 313) where the assignor may be pressuring User A to finish the task. Further, because of the quantity of items on the user interface 300, the user interface element 310 which provides access to the attachments the user needs to review may not even show all attachments in one view (e.g., the user may have to scroll through them). Accordingly, User A may select user interface element 311 to tailor the values of the display parameters to limit distractions.

Figure 4:
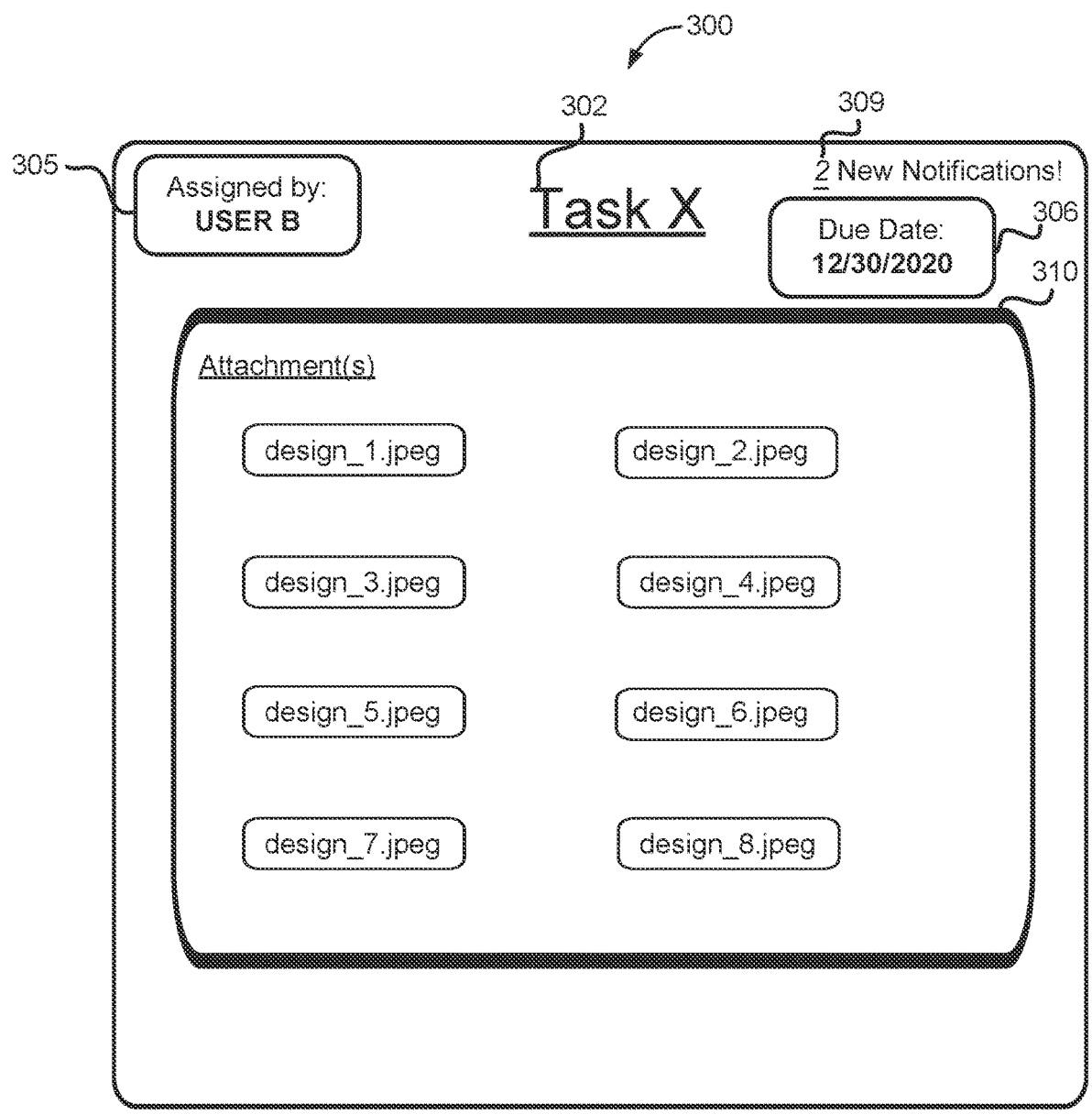
FIG. 4 illustrates a user interface, in accordance with one or more implementations.

FIG. 4 illustrates the user interface 300 of FIG. 3 in accordance with tailored values of the display parameters to reflect a reduction and/or modification of the features available via user interface 300. For example, user interface element 302 displaying the title, user interface element 305 showing the assignor, user interface element 306 showing the due date, user interface element 309 showing and providing access to notifications and/or alerts, and user interface element 310 showing digital content items may be maintained in the user interface 300 as they may be deemed relevant and not a distraction. The user interface element 310 showing digital content items may be resized and/or centered in the user interface 300. Accordingly, user interface element 310 may be more prominent in the user interface 300 and may show the entirety of the digital content items, as reviewing these digital content items is pertinent to the task at hand. The user interface element 309 may show a reduced quantity of notifications and/or alerts as some of the notifications and/or alerts may have been disabled due to the tailoring of the values of the display parameters. Further, the user may have selected that they prefer having title, due date, and assignor information available in the user interface 300 as it helps them stay focused and/or does not distract from their focus.

It is noted that FIGS. 3-4 are for illustrative purposes only and are not to be considered limiting. Instead, it is to be understood that user interfaces may be configured in other ways and/or including other elements in accordance with one or more implementations of the system 100 presented herein. Further, it is noted that while the features and/or functions of the systems and methods presented herein are directed to work unit pages displaying units of work, this is for illustrative purposes only and is not to be considered strictly limiting. Instead, those skilled in the art may appreciate that the functionality of tailoring values of display parameters to impact features available within a user interface may be applied to other types and/or configurations of user interfaces and/or pages displayed within a user interface. By way of non-limiting illustration, one or more features and/or functions presented herein may be carried out using objective pages showing business objectives, project pages showing projects, user interfaces showing queues of units of work, and/or other user interfaces.

Referring back to FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform may include one or more processors configured to execute computer program components. The computer program components may be configured to enable an expert or user associated with the given client computing platform to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, and/or other components. Processor(s) 130 may be configured to execute components 108, 110, and/or 112, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 130 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 130 may be configured to execute one or more additional components that may perform some or all of the functionality attributed below to one of components 108, 110, and/or 112.

Figure 2:
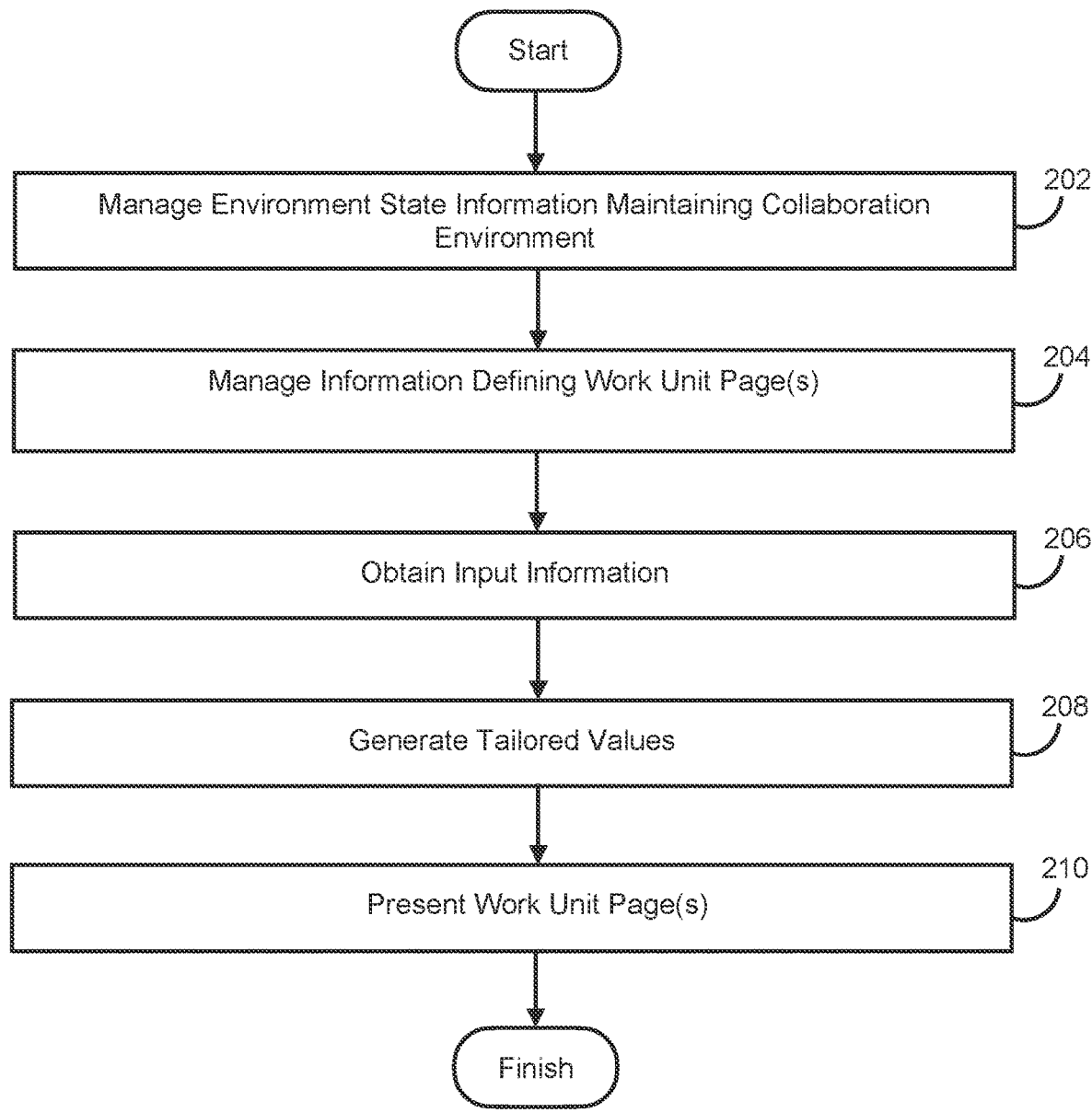
FIG. 2 illustrates a method to selectively configure features of a user interface of a collaboration environment to limit distractions, in accordance with one or more implementations.

FIG. 2 illustrates a method 200 to selectively configure features of a user interface of a collaboration environment to limit distractions, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment and/or other information. The collaboration environment may be configured to facilitate interaction by users with the collaboration environment. The environment state information may include work unit records and/or other records. The work unit records may include values of work unit parameters defining units of work assigned to the users within the collaboration environment. The work unit parameters may include display parameters for individual units of work and/or other information. The display parameters may characterize features of work unit pages through which the users access the units of work. By way of non-limiting illustration, the work unit records may include a first work unit record for a first unit of work assigned to a first user. The first unit of work may be associated with a first work unit page through which the users access the first unit of work. Operation 202 may be performed by one or more hardware processors configured by machine-readable instructions including a component that is the same as or similar to environment state component 108, in accordance with one or more implementations.

An operation 204 may manage information defining individual work unit pages for the individual units of work assigned to individual users. The individual work unit pages may include individual sets of the features in accordance with default values of the display parameters for individual units of work. By way of non-limiting illustration, the first work unit page may include a first set of the features in accordance with the default values of the display parameters of the first unit of work. Operation 204 may be performed by one or more hardware processors configured by machine-readable instructions including a component that is the same as or similar to environment state component 108, in accordance with one or more implementations.

An operation 206 may obtain input information conveying user input into a user interface of the collaboration environment presenting the work unit pages. The user input may include user-initiated requests to tailor the values of the display parameters differently from the default values. By way of non-limiting illustration, the user input may include a first user-initiated request to tailor the values of the display parameters of the first unit of work. Operation 206 may be performed by one or more hardware processors configured by machine-readable instructions including a component that is the same as or similar to user interface component 112, in accordance with one or more implementations.

An operation 208 may, in response to the user input, generate tailored values of the display parameters of the individual units of work. The tailored values of the display parameters for the individual units of work may be associated with individual subsets of the features for the individual work unit pages. By way of non-limiting illustration, in response to the first user-initiated request, a first set of tailored values of the display parameters of the first unit of work may be generated. The first set of tailored values may be associated with a first subset of the features in the first work unit page. Operation 208 may be performed by one or more hardware processors configured by machine-readable instructions including a component that is the same as or similar to focus component 110, in accordance with one or more implementations.

An operation 210 may effectuate presentation of the individual work unit pages in the user interface in accordance with the tailored values of the display parameters to reflect the individual subsets of the features, such that the first work unit page may be presented in accordance with the first set of tailored values to reflect the first subset of the features. Operation 210 may be performed by one or more hardware processors configured by machine-readable instructions including a component that is the same as or similar to user interface component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to selectively configure features of a user interface of a collaboration environment to limit distractions, the system comprising:
  one or more physical processors configured by machine-readable instructions to:
    manage environment state information maintaining a collaboration environment, the collaboration environment being configured to facilitate interaction by users with the collaboration environment, the environment state information including work unit records, the work unit records including values of work unit parameters defining units of work within the collaboration environment, the work unit parameters including a work description parameter, a work assignment parameter, a work completion parameter, and display parameters, the work description parameter characterizing actions assignees are expected to accomplish to complete the units of work, the work assignment parameter characterizing assignment of the units of work to the users who are expected to accomplish the actions to complete the units of work, the work completion parameter characterizing completion status of the units of work, and the display parameters characterizing features of work unit pages comprising parts of a user interface of the collaboration environment through which the users access the work unit records, wherein the features include functionality features, the functionality features including an external resource access feature corresponding to accessibility of external resources managed outside of the collaboration environment from the work unit pages, such that the work unit records include a first work unit record for a first unit of work assigned to a first user, the first unit of work being associated with a first work unit page through which the users access the first work unit record;
    manage information defining individual work unit pages for individual work unit records of individual units of work assigned to individual users, the individual work unit pages including individual sets of the features in accordance with default values of the display parameters of the individual work unit records, such that the first work unit page includes a first set of the features in accordance with the default values of the display parameters of the first work unit record;
    obtain input information conveying user input into the user interface of the collaboration environment presenting the work unit pages, the user input including user-initiated requests to tailor the values of the display parameters differently from the default values, such that the user input includes a first user-initiated request to tailor the values of the display parameters of the first work unit record;

in response to the user input, generate tailored values of the display parameters of the individual work unit records, wherein the tailored values of the display parameters are associated with individual subsets of the features for the individual work unit pages associated with the individual work unit records, wherein the tailored values of the display parameters change the accessibility of the external resources from the individual work unit pages when presenting the individual work unit pages, including in response to the first user-initiated request, generate a first set of tailored values of the display parameters when presenting the first work unit record, the first set of tailored values being associated with a first subset of the features in the first work unit page, wherein the first set of tailored values causes the accessibility of a first external resource from the first work unit page to be disabled; and effectuate presentation of the individual work unit pages in the user interface in accordance with the tailored values of the display parameters to reflect the individual subsets of the features, such that the first work unit page is presented in accordance with the first set of tailored values to reflect the first subset of the features.

2. The system of claim 1, wherein effectuating presentation of the individual work unit pages in the user interface in accordance with the tailored values of the display parameters to reflect the individual subsets of the features includes disabling and/or modifying one or more of the features not included in the individual subsets of the features.

3. The system of claim 1, wherein the features further include display features, the display features corresponding to visual content displayed on the individual work unit pages, and the functionality features corresponding to functional content available on the individual work unit pages.

4. The system of claim 3, wherein the functionality features further include a navigation feature and/or a communication function.

5. The system of claim 3, wherein the display features include one or more of a notification display feature, an aesthetic display feature, or a GUI arrangement feature.

6. The system of claim 3, wherein the user input includes specific indication of one or more of the display features and/or one or more of the functionality features to enable and/or disable.

7. The system of claim 1, wherein the features include one or more agnostic features that are agnostic to the user-initiated requests, such that the one or more agnostic features are made available on the individual work unit pages when either the default values or the tailored values are set for the display parameters, such that the one or more agnostic features are present in the first set of the features and the first subset of the features.

8. The system of claim 1, wherein the user input further includes duration over which the tailored values of the display parameters of the individual work unit records are implemented, such that upon reaching the duration, the values of the display parameters are set back to the default values.

9. The system of claim 1, wherein generating the tailored values of the display parameters of the individual work unit records is based on context information, the context information describing relationships between the units of work and the features, wherein a relationship between a given unit of work and a given feature is defined by a relevancy, such that the tailored values of the display parameters for the given unit of work are generated based on the context information for the given unit of work so that a given subset of the features for a given work unit page for the given unit of work reflects the relevancy between the given unit of work and individual features in the given subsets of the features.

10. The system of claim 9, wherein the relevancy is dictated by a measure of whether the given feature assists in a completion of the given unit of work or distracts from the completion.

11. A method to selectively configure features of a user interface of a collaboration environment to limit distractions, the method comprising:

managing environment state information maintaining a collaboration environment, the collaboration environment being configured to facilitate interaction by users with the collaboration environment, the environment state information including work unit records, the work unit records including values of work unit parameters defining units of work within the collaboration environment, the work unit parameters including a work description parameter, a work assignment parameter, a work completion parameter, and display parameters, the work description parameter characterizing actions assignees are expected to accomplish to complete the units of work, the work assignment parameter characterizing assignment of the units of work to the users who are expected to accomplish the actions to complete the units of work, the work completion parameter characterizing completion status of the units of work, and the display parameters characterizing features of work unit pages comprising parts of a user interface of the collaboration environment through which the users access the work unit records, wherein the features include functionality features, the functionality features including an external resource access feature corresponding to accessibility of external resources managed outside of the collaboration environment from the work unit pages, such that the work unit records include a first work unit record for a first unit of work assigned to a first user, the first unit of work being associated with a first work unit page through which the users access the first work unit record;

managing information defining individual work unit pages for individual work unit records of individual units of work assigned to individual users, the individual work unit pages including individual sets of the features in accordance with default values of the display parameters of the individual work unit records, such that the first work unit page includes a first set of the features in accordance with the default values of the display parameters of the first work unit record;

obtaining input information conveying user input into the user interface of the collaboration environment presenting the work unit pages, the user input including user-initiated requests to tailor the values of the display parameters differently from the default values, such that the user input includes a first user-initiated request to tailor the values of the display parameters of the first work unit record;

in response to the user input, generating tailored values of the display parameters of the individual work unit records, wherein the tailored values of the display parameters are associated with individual subsets of the features for the individual work unit pages associated with the individual work unit records, wherein the tailored values of the display parameters change the accessibility of the external resources from the individual work unit pages when presenting the individual work unit pages, including in response to the first user-initiated request, generating a first set of tailored values of the display parameters when presenting the first work unit record, the first set of tailored values being associated with a first subset of the features in the first work unit page; and effectuating presentation of the individual work unit pages in the user interface in accordance with the tailored values of the display parameters to reflect the individual subsets of the features, including presenting the first work unit page in accordance with the first set of tailored values to reflect the first subset of the features.

12. The method of claim 11, wherein the effectuating presentation of the individual work unit pages in the user interface in accordance with the tailored values of the display parameters to reflect the individual subsets of the features includes disabling and/or modifying one or more of the features not included in the individual subsets of the features.

13. The method of claim 11, wherein the features further include display features, the display features corresponding to visual content displayed on the individual work unit pages, and the functionality features corresponding to functional content available on the individual work unit pages.

14. The method of claim 13, wherein the functionality features further include a navigation feature and/or a communication function.

15. The method of claim 13, wherein the display features include one or more of a notification display feature, an aesthetic display feature, or a GUI arrangement feature.

16. The method of claim 13, wherein the user input includes specific indication of one or more of the display features and/or one or more of the functionality features to enable and/or disable.

17. The method of claim 11, wherein the features include one or more agnostic features that are agnostic to the user-initiated requests, such that the one or more agnostic features are made available on the individual work unit pages when either the default values or the tailored values are set for the display parameters, such that the one or more agnostic features are present in the first set of the features and the first subset of the features.

18. The method of claim 11, wherein the user input further includes duration over which the tailored values of the display parameters of the individual work unit records are implemented, such that upon reaching the duration, the values of the display parameters are set back to the default values.

19. The method of claim 11, wherein the generating the tailored values of the display parameters of the individual work unit records is based on context information, the context information describing relationships between the units of work and the features, wherein a relationship between a given unit of work and a given feature is defined by a relevancy, such that the tailored values of the display parameters for the given unit of work are generated based on the context information for the given unit of work so that a given subset of the features for a given work unit page for the given unit of work reflects the relevancy between the given unit of work and individual features in the given subsets of the features.

20. The method of claim 19, wherein the relevancy is dictated by a measure of whether the given feature assists in a completion of the given unit of work or distracts from the completion.

* * * * *